US011999586B2

(12) United States Patent
Schauer

(10) Patent No.: US 11,999,586 B2
(45) Date of Patent: Jun. 4, 2024

(54) WIRE HANDLING DEVICE

(71) Applicant: SW Automatisierung GmbH, Golling an der Salzach (AT)

(72) Inventor: Johannes Schauer, Kuchl (AT)

(73) Assignee: SW AUTOMATISIERUNG GMBH, Golling an der Salzach (AT)

( * ) Notice: Subject to any disclaimer, the term of this patent is extended or adjusted under 35 U.S.C. 154(b) by 1183 days.

(21) Appl. No.: 16/739,684

(22) Filed: Jan. 10, 2020

(65) Prior Publication Data

US 2020/0148500 A1 May 14, 2020

Related U.S. Application Data

(63) Continuation of application No. PCT/AT2018/060140, filed on Jul. 9, 2018.

(30) Foreign Application Priority Data

Jul. 11, 2017 (AT) .............................. A 50574/2017

(51) Int. Cl.
*B23P 19/00* (2006.01)
*B21C 47/34* (2006.01)
(Continued)

(52) U.S. Cl.
CPC ......... *B65H 51/32* (2013.01); *B21C 47/3433* (2013.01); *B21F 23/00* (2013.01);
(Continued)

(58) Field of Classification Search
CPC .... B65H 51/10; B65H 51/32; B65H 2701/36; H01R 43/052; B21F 23/00; B21C 47/3433
See application file for complete search history.

(56) References Cited

U.S. PATENT DOCUMENTS 4,749,252 A 6/1988 Yanagi et al.
6,385,830 B2 5/2002 Hasegawa
(Continued)

FOREIGN PATENT DOCUMENTS

CN 1309443 8/2001
CN 1319923 10/2001
(Continued)

OTHER PUBLICATIONS

International Search Report issued Nov. 27, 2018 in International (PCT) Application No. PCT/AT2018/060140.

*Primary Examiner* — Paul D Kim

(74) *Attorney, Agent, or Firm* — Wenderoth, Lind & Ponack, L.L.P.

(57) ABSTRACT

A wire handling device for a manufacturing device includes an elongate first wire guiding device having a first guiding section for a wire to be guided along the first guide section, and an elongate second wire guiding device having a second guiding section for a wire to be guided along the second guide section. The wire handling device includes a support device, and the first wire guiding device and the second wire guiding device are placed on the support device. The support device is rotatably mounted about the rotational axis, and the first wire guiding device and the second wire guiding device are mounted so that they can be moved with respect to each other.

21 Claims, 15 Drawing Sheets

(51) Int. Cl.

| | |
|---|---|
| ***B21F 23/00*** | (2006.01) |
| ***B65H 51/10*** | (2006.01) |
| ***B65H 51/32*** | (2006.01) |
| ***H01R 43/052*** | (2006.01) |

(52) U.S. Cl.

CPC ........... *B65H 51/10* (2013.01); *H01R 43/052* (2013.01); *B65H 2701/36* (2013.01)

(56) References Cited

U.S. PATENT DOCUMENTS

| | | | | |
|---|---|---|---|---|
| 6,397,900 | B1 * | 6/2002 | Sautter | B21F 1/00 72/131 |
| 8,624,109 | B2 | 1/2014 | Traeholt et al. | |
| 9,061,088 | B2 * | 6/2015 | Simpson | A61L 31/022 |
| 9,331,468 | B2 | 5/2016 | Traeholt et al. | |
| 2001/0013162 | A1 | 8/2001 | Hasegawa | |
| 2001/0025870 | A1 | 10/2001 | Hasegawa | |
| 2010/0126748 | A1 | 5/2010 | Traeholt et al. | |
| 2012/0017732 | A1 | 1/2012 | Fischer et al. | |
| 2014/0135222 | A1 | 5/2014 | Traeholt et al. | |

FOREIGN PATENT DOCUMENTS

| | | |
|---|---|---|
| CN | 205622018 | 10/2016 |
| CN | 206293760 | 6/2017 |
| EP | 0 989 637 | 3/2000 |
| EP | 1 993 175 | 11/2008 |
| JP | 2013-150545 | 8/2013 |
| KR | 1991-0000062 | 1/1991 |
| KR | 10-2016-0002008 | 1/2016 |
| WO | 2016/125564 | 8/2016 |

* cited by examiner

WIRE HANDLING DEVICE

BACKGROUND OF THE INVENTION

The present invention concerns a wire handling apparatus and a manufacturing apparatus having such a wire handling apparatus.

In the manufacturing and packaging of wires by means of a manufacturing apparatus a wire is fed from a wire reservoir, for example a wire roll, to a wire handling apparatus which serves to guide the wire and transfer it to wire processing stations. Usually in that case firstly wire is guided out of the wire reservoir and through the wire handling apparatus until the desired length of wire is present, whereupon the wire is cut to length, for example by a cutting device arranged between the wire reservoir and the wire handling apparatus. Then the first end of the wire which is guided and held in the wire handling apparatus is passed by the wire handling apparatus to a processing station in the form of a wire manufacturing device. The wire end is processed in the wire manufacturing device by for example the wire end being stripped of insulation and/or by a wire termination (for example a cable shoe, a flat plug, a crimp contact, a shrink tube, a cable sleeve, a grommet or the like) being applied at the wire end. Subsequently the wire is again moved through the wire handling apparatus (now in the opposite direction) and the second wire end is guided to the same or a further processing station so that the second wire end can also be provided with a wire termination. The correspondingly produced wire is then removed from the wire handling apparatus by a transfer apparatus (for example a robot arm) and transferred to further processing stations that may possibly be provided like for example a marking station or an arrangement station.

In context of the present disclosure the term wire includes individual insulated or bare wires, single-core or multi-core wires or cables with sheathing, wiring harnesses, strands, glass fibre cables or the like.

Known wire handling apparatuses have two wire guide apparatuses or devices, which are arranged at a certain spacing relative to each other so that between the guide portions of the wire guide apparatuses there is a gap which the front wire end has to bridge over when the wire is being passed through the wire guide apparatuses. So that the wire end after that gap can actually also pass into the guide portion of the wire guide apparatus which is the second one or the rear one from the point of view of the wire it is important that the wire is already substantially exactly oriented in a straight line before being introduced into the first guide portion of the wire guide apparatus which is the first one or the front one from the point of view of the wire, and complicated and cumbersome wire orienting apparatuses are necessary for that purpose.

SUMMARY OF THE INVENTION

The object of the invention is to avoid the above-described disadvantages and to provide a wire handling apparatus which permits improved wire guidance.

That object is attained by a wire handling apparatus as described below and a manufacturing apparatus having such a wire handling apparatus.

The invention provides that the first wire guide apparatus and the second wire guide apparatus are arranged moveably relative to each other.

In that way, the two guide portions of the two wire guide devices can be disposed in the immediate proximity so that the gap between the two guide portions can be minimized. It is particularly desirable if the two wire guide devices are moved so far relative to each other that the two wire guide devices bear directly against each other and thus the second guide portion directly adjoins the first guide portion, whereby the two guide portions form a continuous guide portion which extends through both wire guide devices. As therefore there is no longer a gap between the guide portions that the wire has to bridge over it is also no longer necessary for the wire to be exactly oriented in a straight line before passing into the wire handling apparatus. Aligning the wire can thus either be effected less precisely and therefore with lower complication and involvement or it can be even entirely eliminated.

According to a preferred embodiment, the first wire guide device and/or the second wire guide device is or are of a substantially tubular configuration, wherein preferably the first guide portion and/or the second guide portion is or are substantially in the form of a cylindrical hollow space. Basically a cross-section of the first guide portion and/or the second guide portion transversely relative to the longitudinal extent can be inter alia round, oval, square or rectangular.

Preferably, the first guide portion has a substantially rectilinear configuration along a longitudinal direction and/or the second guide portion is of a substantially rectilinear configuration along the longitudinal direction.

Preferably, the first wire guide device and the second wire guide device are arranged in succession in the longitudinal direction. In particular, the first wire guide device and the second wire guide device can be arranged in a mutually aligned relationship in the longitudinal direction.

A preferred variant provides that the first wire guide device is moveable in the longitudinal direction relative to the second wire guide device and/or the second wire guide device is moveable in the longitudinal direction relative to the first wire guide device.

In that case, therefore, one of the two wire guide devices or both wire guide devices can be moved with a translation movement along the longitudinal direction.

Particularly, if the wire guide devices are of a tubular configuration the longitudinal direction represents a longitudinal axis of the cylindrical hollow spaces forming the guide portions and the translation movement can take place axially along the longitudinal axis.

A particularly advantageous embodiment of the invention is one in which the first wire guide device and the second wire guide device are moveable into a pass-through position, wherein in the pass-through position the first wire guide device and the second wire guide device are arranged substantially directly in succession in the longitudinal direction. In that case, the mutually facing ends of the wire guide devices and the two guide portions form a continuous guide portion extending through both wire guide devices.

A movement of the wire guide devices into the pass-through position can be effected, for example, by the first wire guide device being stationary and by the second wire guide device being moved in the direction of the first wire guide device. Equally that movement can be effected by the second wire guide device being stationary and the first wire guide device being moved in the direction of the second wire guide device. Naturally, both wire guide devices can move towards each other.

In a particularly preferred embodiment, the first wire guide device and the second wire guide device are moveable into a conveyor position, wherein in the conveyor position the first wire guide device and the second wire guide device are arranged in mutually spaced relationship in the longitudinal direction. In that respect, the wire handling apparatus includes a wire conveyor apparatus, wherein the wire conveyor apparatus is moveable in the conveyor position between the first wire guide device and the second wire guide device.

In that respect, the wire conveyor apparatus can be brought into engagement in the conveyor position of the wire guide devices with a wire extending between the first wire guide device and the second wire guide device whereby the wire can be transported in the forward or rearward direction (in relation to the longitudinal direction). Preferably, the wire conveyor apparatus can be brought into engagement with the wire during the transition of the wire guide devices from the pass-through position to the conveyor position.

Preferably, the wire conveyor apparatus includes two mutually oppositely rotating transport rollers. In that case, the two transport rollers are moveable towards each other transversely relative to the longitudinal direction, for example by a linear drive or a pneumatic cylinder. The wire conveyor apparatus can also include two belt systems in which a respective belt is arranged around at least two rollers and is driven by the rollers, wherein the two belt systems can be brought into engagement with the wire and thus the wire can be clamped between the two belts and advanced by the two belts.

The two transport rollers can clamp the wire between the running surfaces of the transport rollers and thus can move the wire in the longitudinal direction and in opposite relationship thereto upon rotation of the transport rollers in mutually opposite directions.

The wire handling apparatus includes a support device, the first wire guide device and the second wire guide device being arranged on the support device.

In that arrangement, the support device can have a plate-shaped or disc-shaped or panel-shaped configuration.

Preferably, the first wire guide device and/or the second wire guide device is or are arranged moveably with a translation movement, preferably in the longitudinal direction, on the support device.

The first wire guide device and/or the second wire guide device can therefore be mounted moveably in the longitudinal direction on the support device, and a movement of the first wire guide device and/or the second wire guide device can be effected for example by a linear drive. In that respect, one of the two wire guide devices can be arranged stationarily on the support device, and the other of the two wire guide devices can be mounted moveably in the longitudinal direction on the support device. Naturally, both wire guide devices can be mounted moveably in the longitudinal direction on the support device.

The support device is mounted rotatably about an axis of rotation. Preferably in that case, the axis of rotation extends substantially perpendicularly to the longitudinal direction.

The support device can be mounted rotatably about the axis of rotation for example on a support structure or a frame so that the wire end can be fed to a processing unit arranged in the corresponding angular position. In particular in that way, the same processing unit can also be used for both wire ends as, after processing of the front or first wire end, the support device can be pivoted about the axis of rotation through 180° so that the rear or second wire end can be fed to the processing unit.

A particular variant provides that the support device is mounted moveably with a translation movement.

In that way, a wire end can not only be pivoted in the direction of a processing unit but the wire end can also be fed to the processing unit and transferred to the processing unit without the wire having to be moved relative to the wire guide devices.

Preferably, the support device includes a first support plate and the second support plate, the first support plate being moveable relative to the second support plate.

In that case, the first support plate can be arranged moveably with a translation movement on the second support plate. That simplifies the structure of a support device which is also mounted rotatably about an axis of rotation as, by virtue of rotation of the second support plate, the first support plate is also automatically rotated therewith and the first support plate only has to be moved relative to the second support plate to feed the wire end to the processing unit.

Preferably, a guide bar is arranged at the second support plate, the first support plate being arranged displaceably along the guide bar. The movement of the first support plate relative to the second support plate can again be effected for example by means of a linear drive.

Improved wire guidance by the wire handling apparatus can also be achieved if the first wire guide device is adapted to be divisible along the first guide portion into at least two parts and/or the second wire guide device is adapted to be divisible along the second guide portion into at least two parts.

By virtue of a divisible configuration of the wire guide devices along the guide portions, it is also possible for a wire end which is provided with a wire termination and which because of the wire termination has outside dimensions that are increased in comparison with the wire diameter, to be guided along the correspondingly enlarged guide portions through the wire guide devices. In other words, this makes it possible for wires of different thicknesses or wires with fitted wire terminations to be guided through the wire guide devices.

In a preferred variant, the at least two parts are moveable relative to each other.

The wire guide devices can therefore be adapted to be divisible along a respective longitudinal extent into at least two parts which are mounted moveably relative to each other. In that case, the movement can be radial in the relation to a longitudinal direction or longitudinal axis of the wire guide devices or the guide portions thereof.

It is particularly desirable if the at least two parts include a first guide part and a second guide part, wherein the second guide part can be lifted off the first guide part.

That represents a structurally particularly simple variant in which the wire guide devices are divided along their longitudinal extents into respective two halves (lower first guide part and upper second guide part) and for enlargement of the guide portions the respective upper halves are lifted off the lower halves. The lifting movement of the upper guide parts can be effected radially or transversely relative to the longitudinal extents of the wire guide devices.

A manufacturing apparatus can have the proposed wire handling apparatus.

In a preferred variant, the manufacturing apparatus includes at least one processing unit in the form of a wire manufacturing device. A wire end of the wire guided by the wire handling apparatus can be transferred from the wire handling apparatus to the wire manufacturing device in order to provide the wire end, for example, with a wire termination.

The at least one processing unit can for example involve an open, free-standing or incorporated wire manufacturing apparatus having an opening for introduction of a wire end.

Preferably, the wire manufacturing device has an opening for the introduction of a wire end, the opening being of a funnel-shaped configuration. Introduction of the wire end can be facilitated by the funnel-shaped opening as, in the event of the wire end being not exactly centrally transferred, the wire end is guided to the opening along the funnel shape.

The at least one wire handling apparatus can have at least one connecting device for docking the at least one wire handling apparatus to the wire manufacturing device, wherein preferably the at least one connecting device has a conical region corresponding to the funnel-shaped opening. With the provision of a conical region corresponding to the funnel-shaped opening at the connecting device positively locking docking of the connecting device at the funnel-shaped opening can take place and the wire end can be unimpededly introduced through the opening into the wire manufacturing device.

Preferably, a respective connecting device is arranged at the mutually remote ends of the first wire guide device and the second wire guide device. That can ensure central docking of the wire handling apparatus at the wire manufacturing device for both wire ends.

BRIEF DESCRIPTION OF THE DRAWINGS

Further details and advantages of the present invention are described by means of the specific description hereinafter. In the drawings.

DETAILED DESCRIPTION OF THE INVENTION

Figure 1:
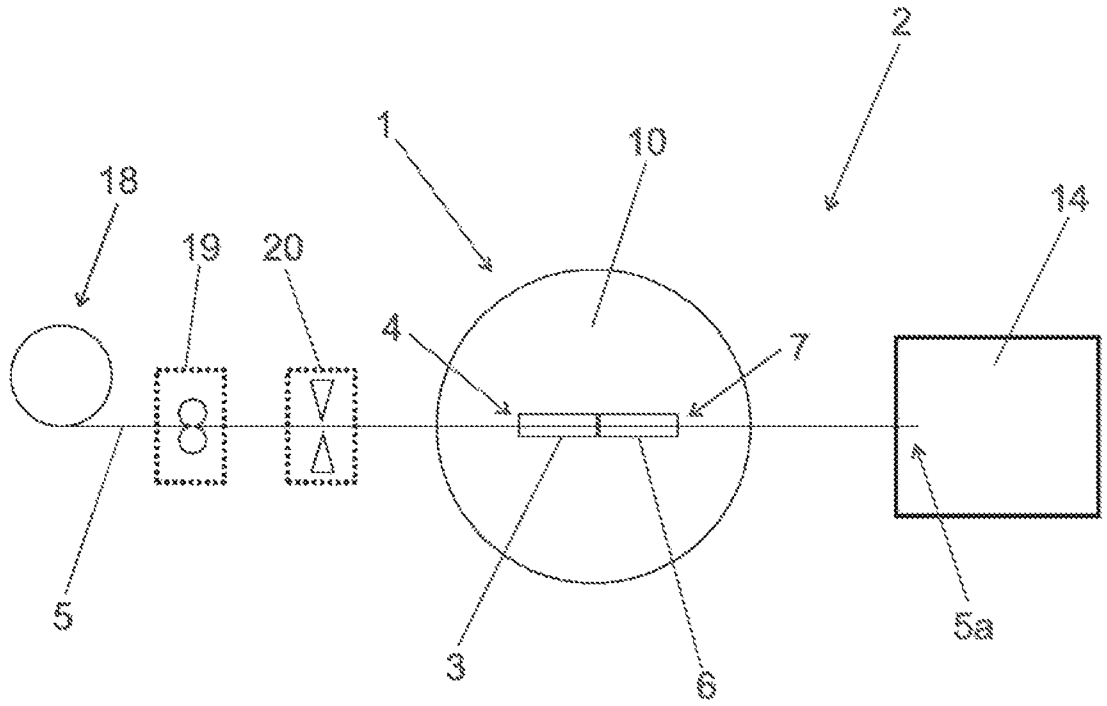
FIG. 1 is a diagrammatic view of a manufacturing apparatus with a proposed wire handling apparatus.

FIG. 1 shows a diagrammatic view of a manufacturing apparatus 2 with a proposed wire handling apparatus 1. The wire handling apparatus 1 includes a first wire guide device 3 having a first guide portion 4 for a wire 5 to be guided along the first guide portion 4 and a second wire guide device 6 having a second guide portion 7 for a wire 5 to be guided along the second guide portion 7. The two wire guide devices 3, 6 are arranged on a support device 10 and are of a tubular configuration, the two guide portions 6, 7 being in the form of cylindrical hollow spaces. The two wire guide devices 3, 6 are arranged in succession in the direction of the longitudinal axes of the two cylindrical hollow spaces and are arranged moveably relative to each other in the direction of the longitudinal axes on the support device 10.

In the illustrated apparatus 2 wire 5 is passed from a wire reservoir 18 in the form of a wire roll by means of an advance device 19 through the two guide portions 6, 7 of the two wire guide devices 3, 6 and a first wire end 5*a* is introduced into a processing unit in the form of a wire manufacturing device 14 in order to provide the first wire end 5*a* with a wire termination 22 (not shown here). There is also a cutting device 20 for cutting the wire 5 to the desired length.

Figure 2A:
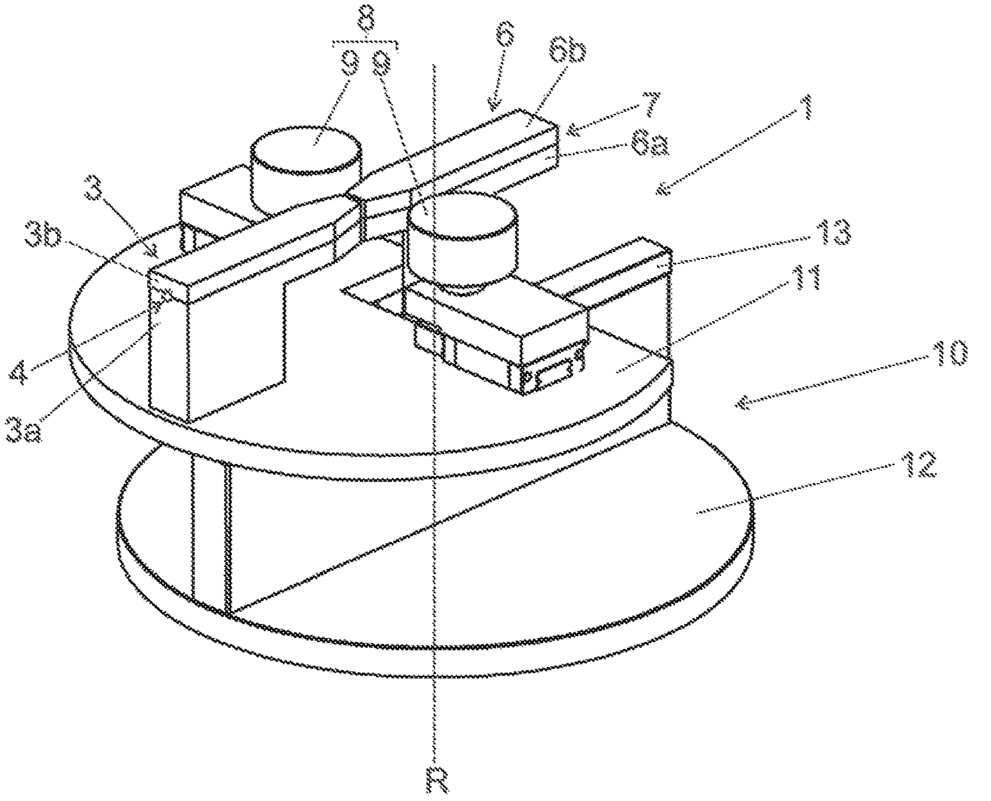
FIGS. 2*a* and 2*b* show an embodiment of a proposed wire handling apparatus as a perspective view and a plan view.
Figure 2B:
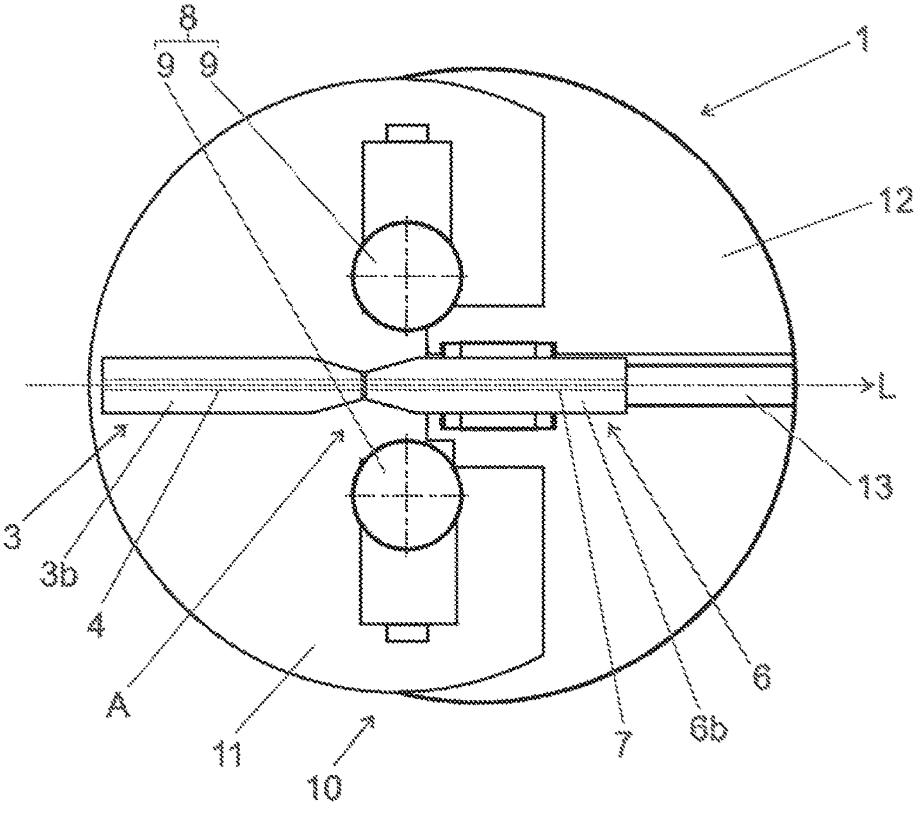

FIG. 2*a* shows an embodiment of a proposed wire handling apparatus 1 as a perspective view while FIG. 2*b* shows a plan view of that wire handling apparatus 1.

The wire handling apparatus 1 includes a first wire guide device 3 having a first guide portion 4 for a wire 5 to be guided along the first guide portion 4 and a second wire guide device 6 having a second guide portion 7 for a wire 5 to be guided along the second guide portion 7. The first guide portion 4 is of a substantially rectilinear configuration along a longitudinal direction L and the second guide portion 7 is also of a substantially rectilinear configuration along the longitudinal direction L. The two guide portions 6, 7 are substantially in the form of cylindrical hollow spaces. The first wire guide device 3 and the second wire guide device 6 are arranged in succession in the longitudinal direction L, wherein the first guide portion 4 and the second guide portion 7 are oriented in mutually aligned relationship in the longitudinal direction L. In FIG. 2*b* the two guide portions 6, 7 are indicated in broken line in the interior of the wire guide devices 3, 6.

In the illustrated view the two wire guide devices 3, 6 are in their pass-through position A in which the first wire guide device 3 and the second wire guide device 6 are arranged in substantially directly successive relationship in the longitudinal direction L. The two mutually facing ends of the wire guide devices 3, 6 taper in the direction of the guide portions 6, 7 in order in the transition from the pass-through position A to the conveyor position B to make it easier for the transport rollers 9 of the wire conveyor apparatus 8 to come into engagement with the wire 5.

The first wire guide device 3 in this example is adapted to be divisible along the first guide portion 4 into two parts—a first guide part 3*a* and a second guide part 3*b*—and the second wire guide device 6 is also adapted to be divisible into two parts—a first guide part 6*a* and a second guide part 6*b*—along the second guide portion 7. The two guide parts 3*a*, 3*b* of the first wire guide device 3 are moveable relative to each other, wherein the second guide part 3*b* can be lifted off the first guide part 3*a*. Equally the two guide parts 6*a*, 6*b* of the second wire guide device 6 are also moveable relative to each other, wherein the second guide part 6*b* can be lifted off the first guide part 6*a*. In the illustrated position the two second guide parts 3*b*, 6*b* lie on the two first guide parts 3*a*, 6*a* whereby the two guide portions 4, 7 extend along the longitudinal direction L within the two wire guide devices 3, 6. In the two respectively mutually adjoining guide parts 3*a* and 3*b*, 6*a* and 6*b*, there is a respective recess which is of a continuous trough-shaped configuration in the longitudinal direction L so that the two guide portions 6, 7 are substantially in the form of cylindrical hollow spaces.

The wire handling apparatus 1 further includes a support device 10, the first wire guide device 3 and the second wire guide device 6 being arranged on the support device 10. The support device 10 includes a first support plate 11 and a second support plate 12, wherein the first support plate 11 is moveable relative to the second support plate 12 by a guide bar 13 being arranged on the second support plate 12, the first support plate 11 being arranged displaceably along the guide bar 13. In the illustrated embodiment the first wire guide device 3 is arranged stationarily on the first support plate 11 and the second wire guide device 6 is arranged moveably with a translation movement in the longitudinal direction L on the support device 10 by the second wire guide device 6 being arranged displaceably along the guide bar 13.

The support device 10 and the second support plate 12 thereof are mounted rotatably about an axis of rotation R on a support structure or frame (not shown here).

Reference is now made to FIGS. 3*a* to 15*b* to describe by way of example a procedure for manufacturing a wire 5 with a proposed wire handling apparatus 1 as shown in FIGS. 2*a* and 2*b*. The different positions of the wire handling apparatus 1 which occur in that case are respectively shown as a perspective view and a plan view.

Figure 3A:
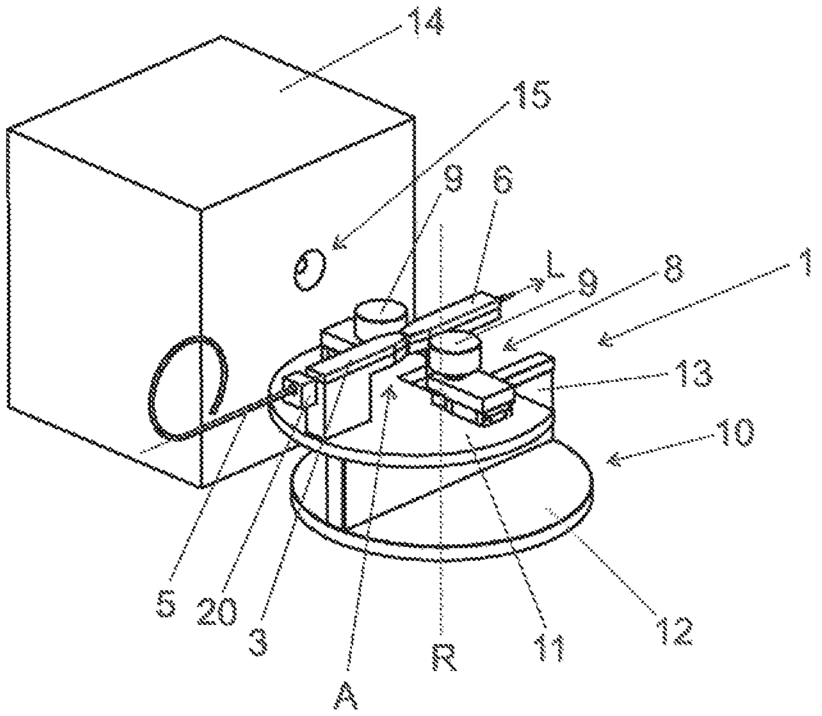
FIGS. 3*a* to 15*b* show various positions of a proposed wire handling apparatus during an implementation by way of example of a wire manufacturing process as perspective views and plan views.
Figure 3B:
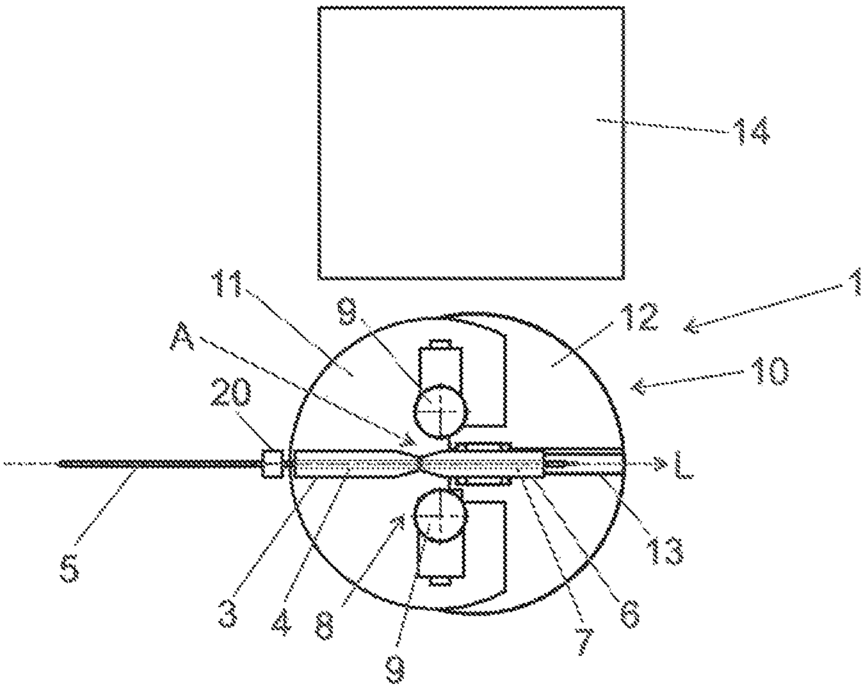

In the position of the wire handling apparatus 1 shown in FIGS. 3*a* and 3*b* a wire 5 is passed from a wire reservoir 18 (not shown here) by means of an advance device 19 (not shown here) through the two guide portions 6, 7 of the two wire guide devices 3, 6. The two wire guide devices 3, 6 are in their pass-through position A in which the first wire guide device 3 and the second wire guide device 6 are arranged substantially directly in succession in the longitudinal direction L and the two guide portions 6, 7 are oriented in mutually aligned relationship in the longitudinal direction L so that they form a continuous guide portion for the wire 5, that extends along the two wire guide devices 3, 6. The wire 5 was passed through the guide portions 6, 7 to such an extent that it projects beyond the second wire guide device 6 in the longitudinal direction L.

Figure 4A:
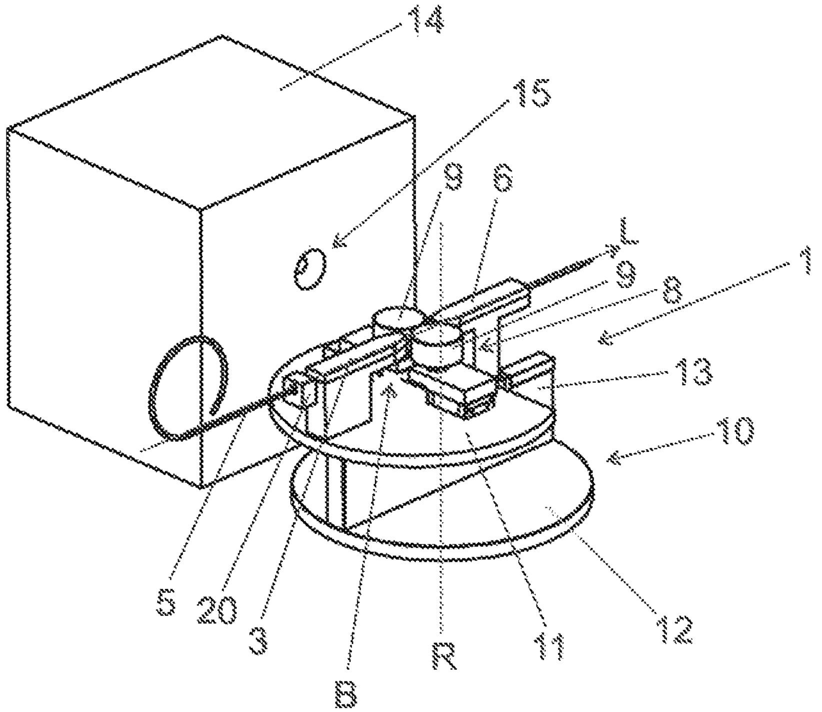
Figure 4B:
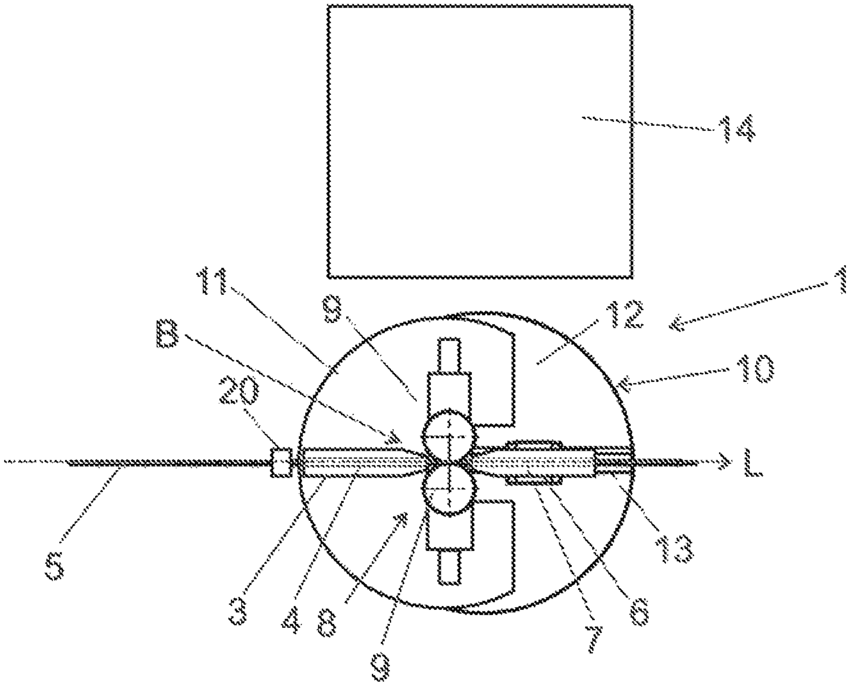

In the position shown in FIGS. 4*a* and 4*b* the second wire guide device 6 was moved in the longitudinal direction L relative to the first wire guide device 3 so that the two wire guide devices 3, 6 were transferred from their pass-through position A into their conveyor position B in which the first wire guide device 3 and the second wire guide device 6 are arranged in mutually spaced relationship in the longitudinal direction L. During the transfer from the pass-through position A into the conveyor position B the two transport rollers 9 of the wire conveyor apparatus 8 were moved radially in relation to the longitudinal direction L into the resulting gap between the first wire guide device 3 and the second wire guide device 6 so that the wire 5 is clamped between the transport rollers 9 and can be moved by mutually opposite rotation of the transport rollers 9 in the longitudinal direction L. The wire 5 is now moved by the wire conveyor apparatus 8 in the longitudinal direction L until the desired wire length for that wire 5 to be manufactured is reached. The wire 5 is then suitably cut to length by a cutting device 20.

Figure 5A:
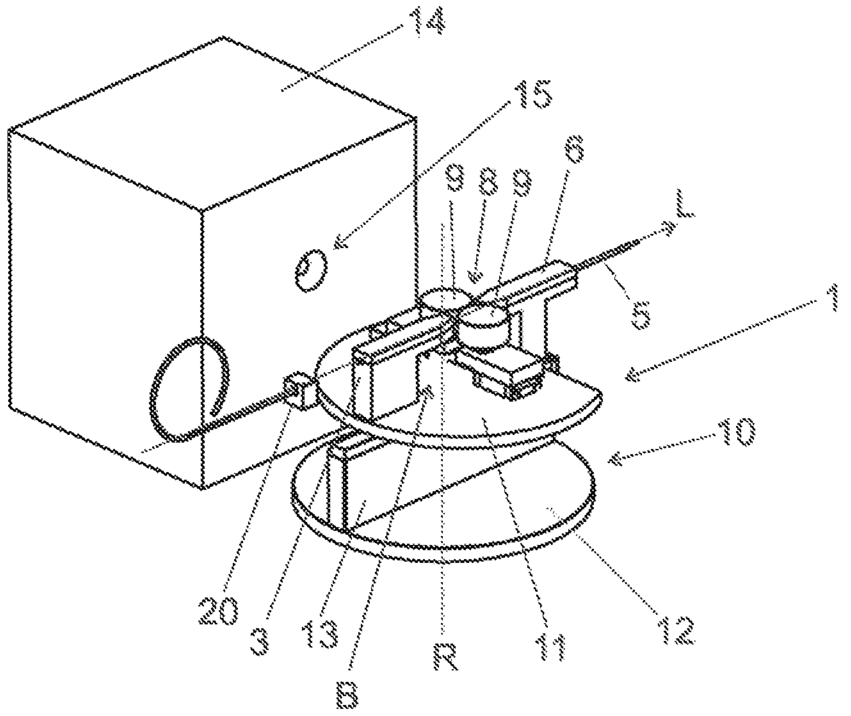
Figure 5B:
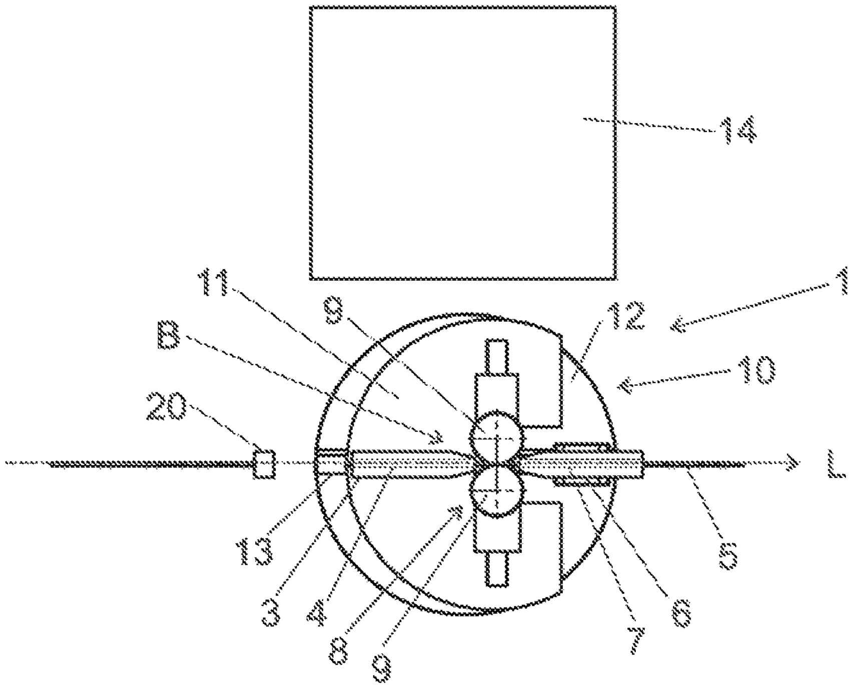

FIGS. 5*a* and 5*b* show a position of the wire handling apparatus 1 in which the wire 5 has already been cut to length by means of the cutting device 20 and the two wire guide devices 3, 6 have been moved in the longitudinal direction L relative to the second support plate 12 of the support device 10 by both the second wire guide device 6 and also the first support plate 11—on which the first wire guide device 3 and the wire conveyor device apparatus 8 are arranged—having been moved in the longitudinal direction L along the guide bar 13. The two wire guide devices 3, 6 were however not moved relative to each other in that case so that they are still disposed in their conveyor position B.

Figure 6A:
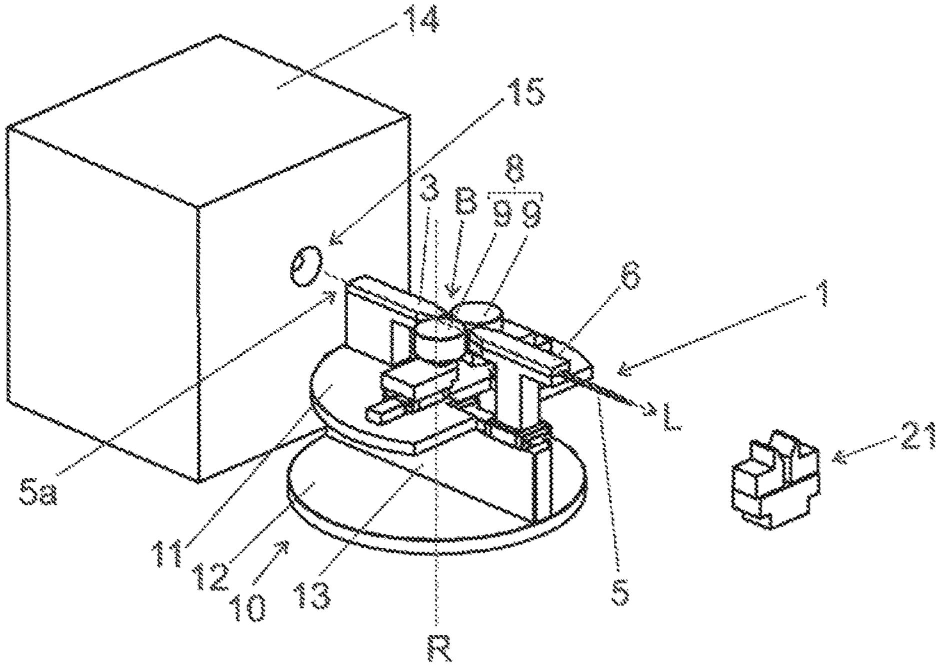
Figure 6B:
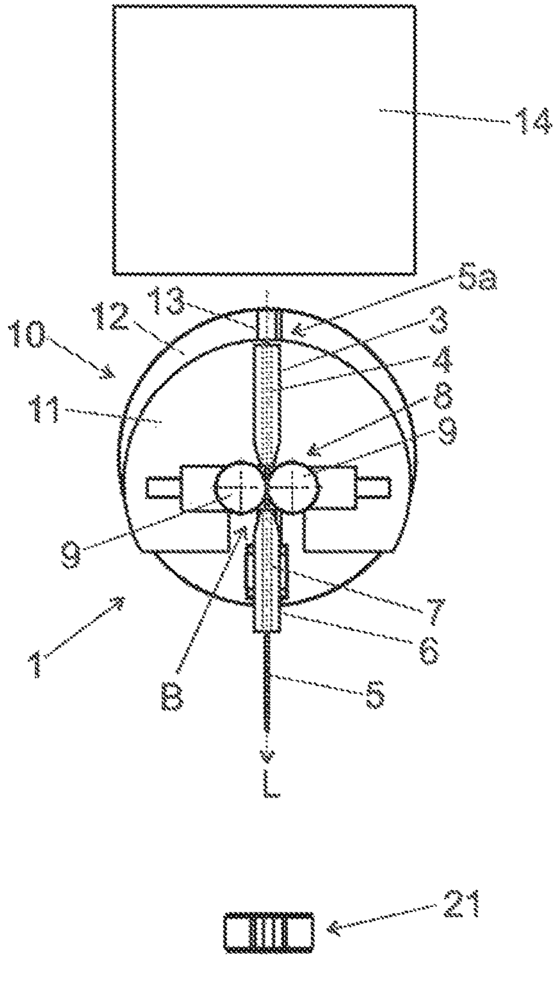

In the position of the wire handling apparatus 1 shown in FIGS. 6*a* and 6*b* the carrier device 10 has been rotated through 90° in the clockwise direction (when viewing the plan view) about the axis of rotation R so that now the first wire end 5*a* of the wire 5, that was just cut to length, is oriented in the direction of an opening 15 of a wire manufacturing device 14. The rotation of the support device 10 about the axis of rotation R was effected by the second support plate 12 of the support device 10, that is mounted rotatably on a frame or support structure (not shown here) having been suitably rotated. It will be appreciated that depending on the respective arrangement of a processing unit, the support device 10 can be rotated into any desired angular position.

Figure 7A:
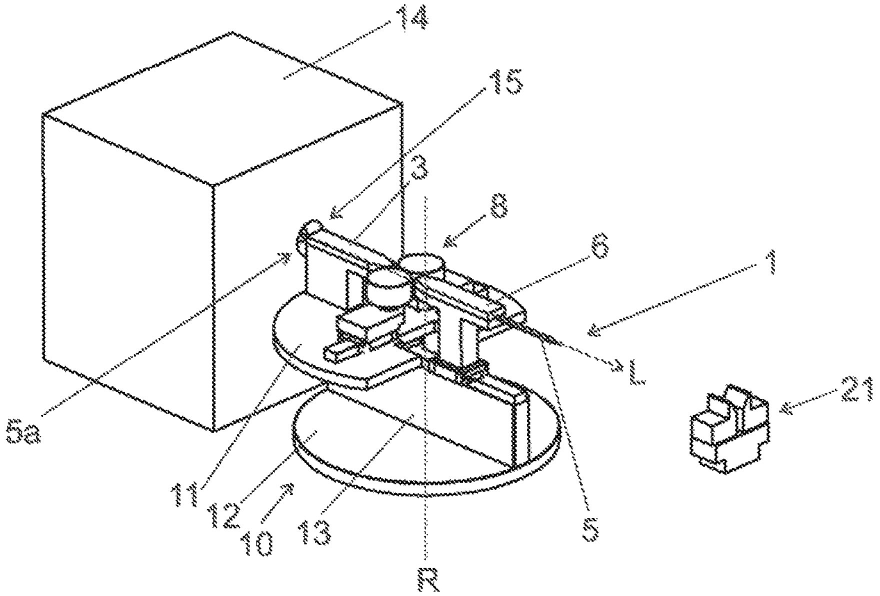
Figure 7B:
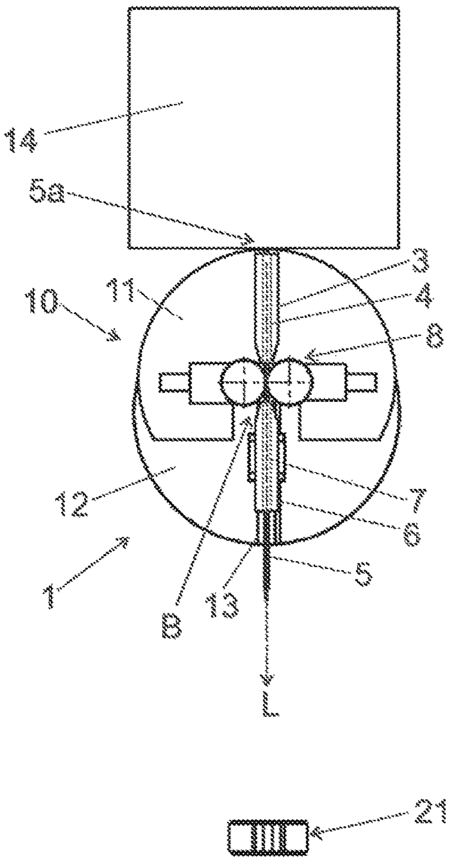

In the position shown in FIGS. 7*a* and 7*b* the two wire guide devices 3, 6 were moved in opposite relationship to the longitudinal direction L relative to the second support plate 12 of the support device 10, by both the second wire guide device 6 and also the first support plate 11—on which the first wire guide device 3 and the wire conveyor apparatus 8 are arranged—having been displaced in opposite relationship to the longitudinal direction L along the guide bar 13. As a result the first wire end 5*a* was transferred from the wire handling apparatus 1 to the wire manufacturing device 14 by the first wire end 5*a* having been introduced through the opening 15 of the wire manufacturing device 14 into the wire manufacturing device 14. The opening 15 is of a funnel-shaped configuration to facilitate introduction of the first wire end 5*a*.

Figure 7C:
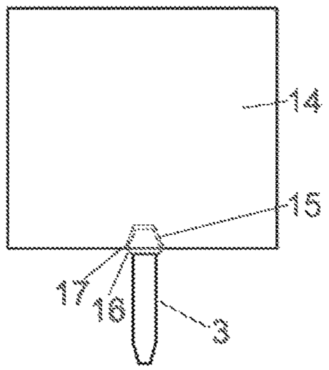

FIG. 7*c* shows an alternative variant of the first wire guide device 3. In this case arranged at the end of the first wire guide device 3, that is towards the wire manufacturing device 14, is a connecting device 16, wherein the connecting device 16 has a conical region 17 corresponding to the funnel-shaped opening 15 indicated here in broken line. In that way positively locking docking of the connecting device 16 to the funnel-shaped opening 15 can take place and the first wire end 5*a* can be unimpededly introduced through the opening 15 into the wire manufacturing device 14. It can also be provided that a respective connecting device 16 is arranged at the mutually remote ends of the first wire guide device 3 and the second wire guide device 6.

Figure 8A:
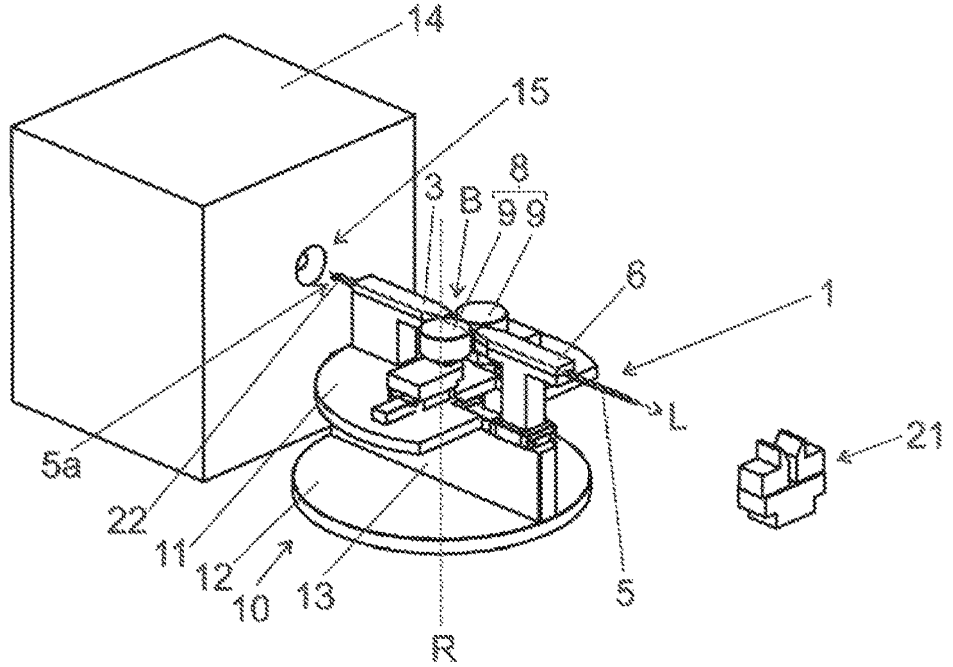
Figure 8B:
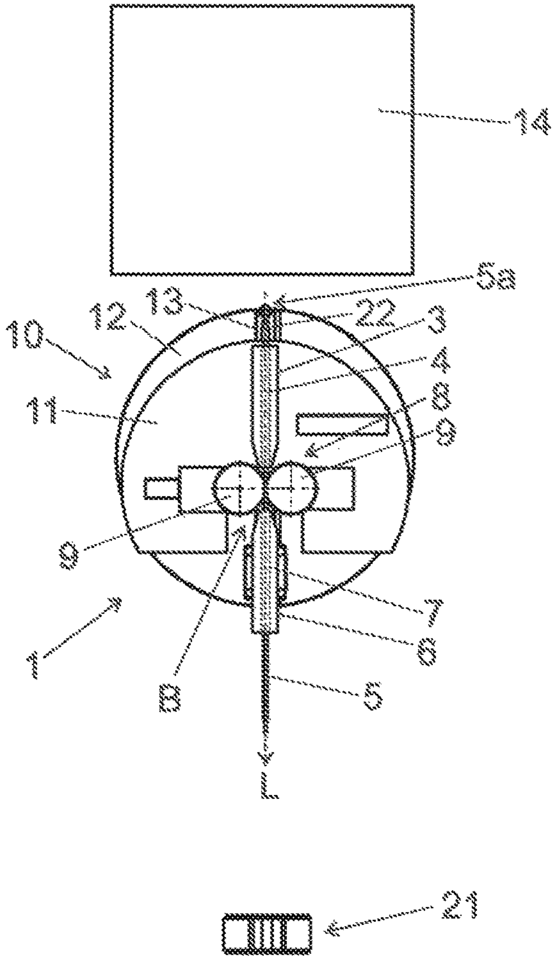

FIGS. 8*a* and 8*b* show a position of the wire handling apparatus 1 in which the first wire end 5*a* was provided in the wire manufacturing device 14 with a wire termination 22 in the form of a cable shoe. In the illustrated position the two wire guide devices 3, 6 were moved in the longitudinal direction L relative to the second support plate 12 of the support device 10, by both the second wire guide device 6 and also the first support plate 11 having been displaced in the longitudinal direction L along the guide bar 13. In that case the first wire end 5*a* provided with the wire termination 22 was passed out of the wire manufacturing device 14 through the opening 15.

Figure 9A:
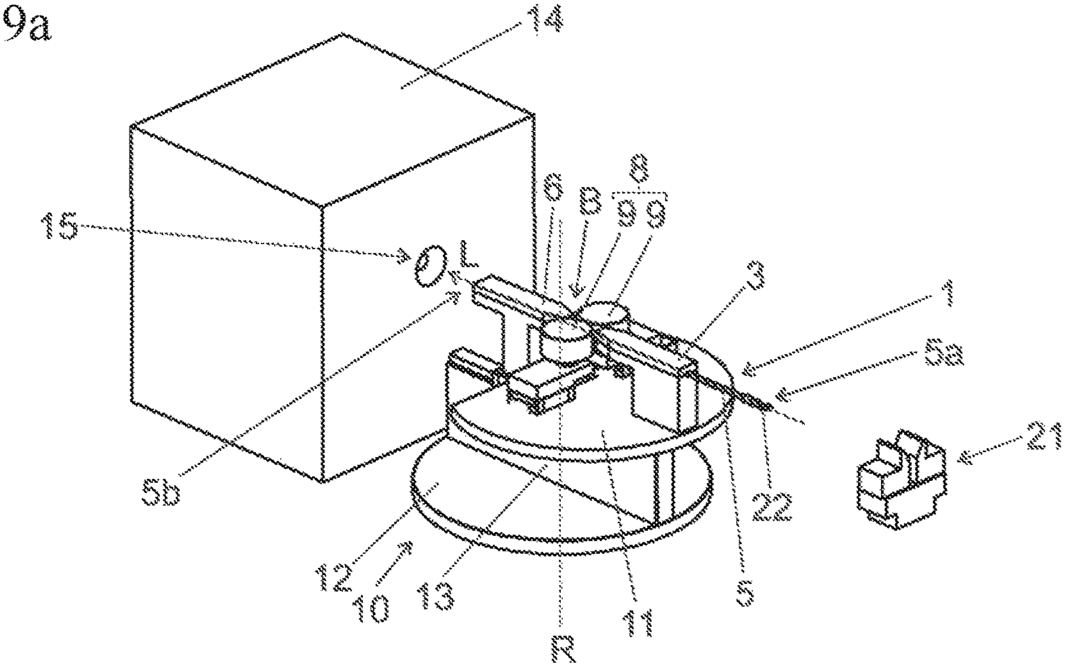
Figure 9B:
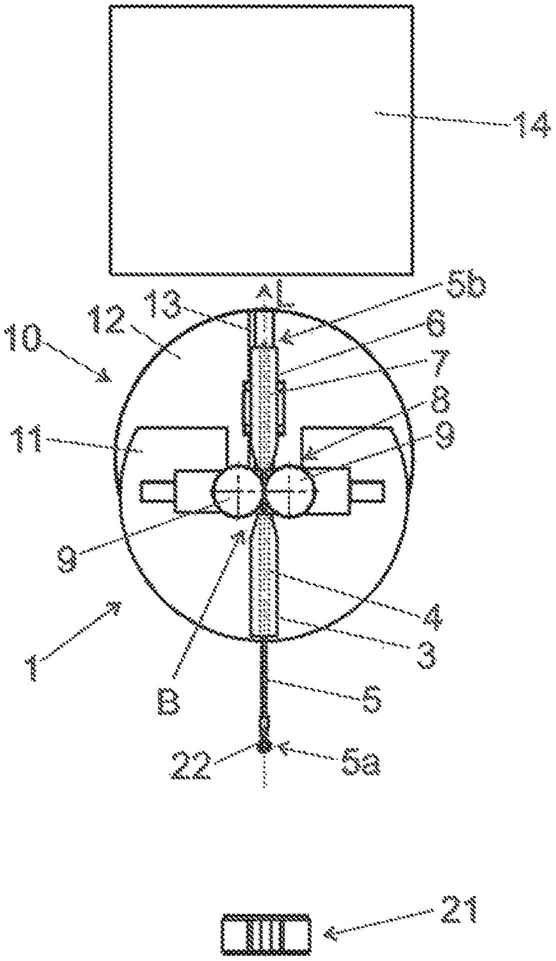
Figure 10A:
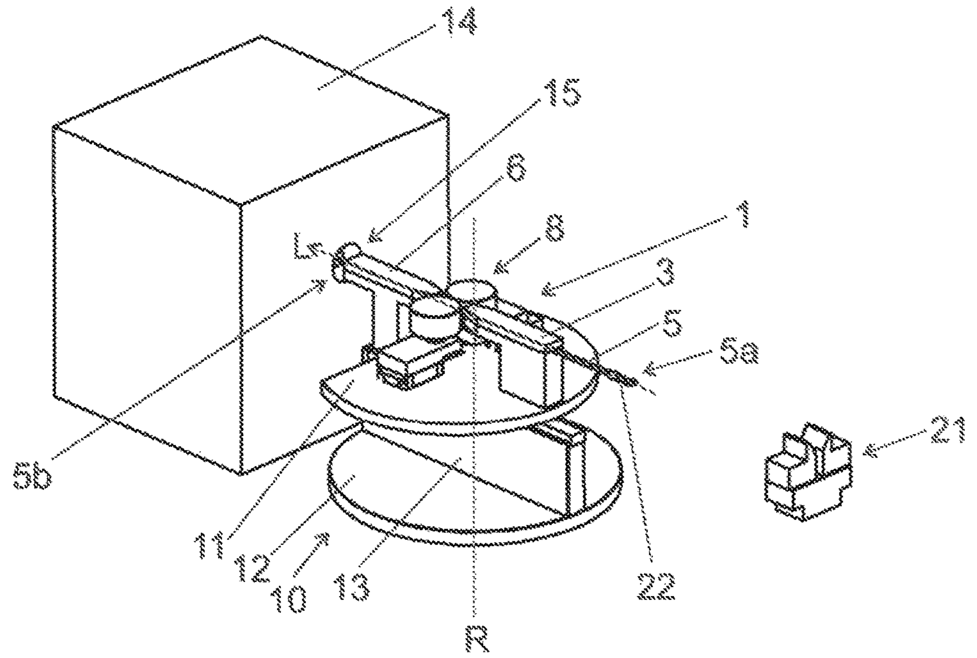
Figure 10B:
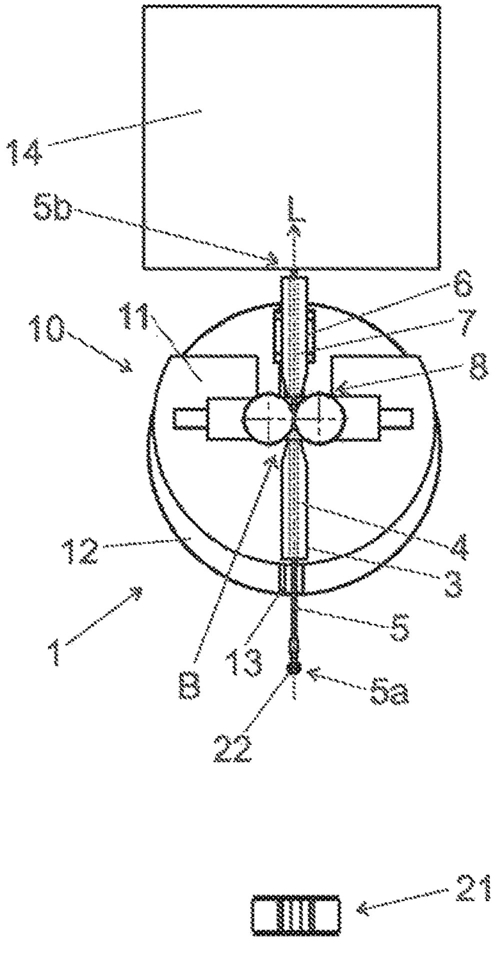
Figure 11A:
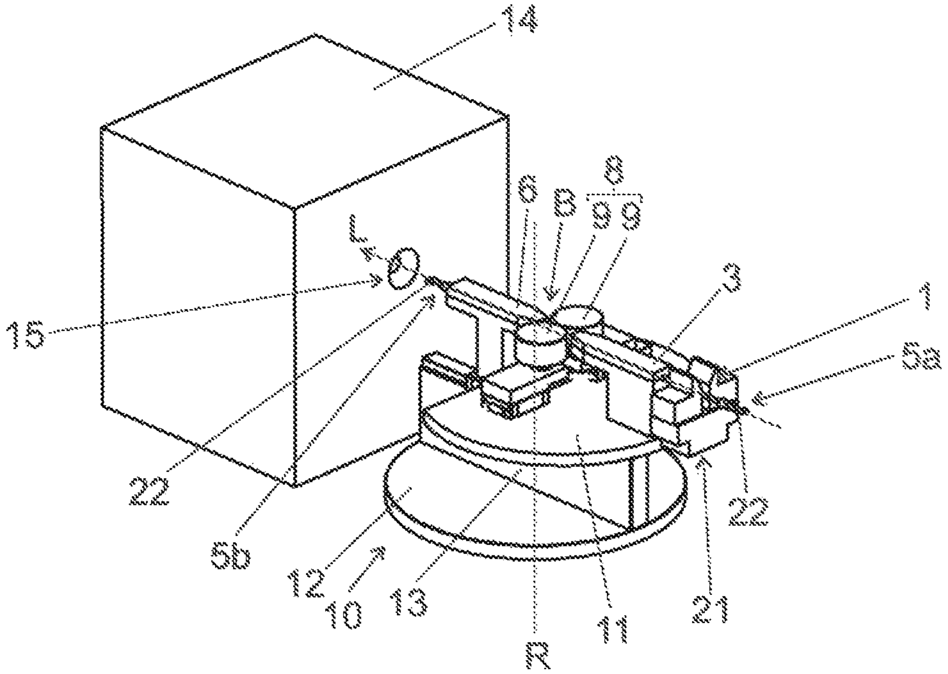
Figure 11B:
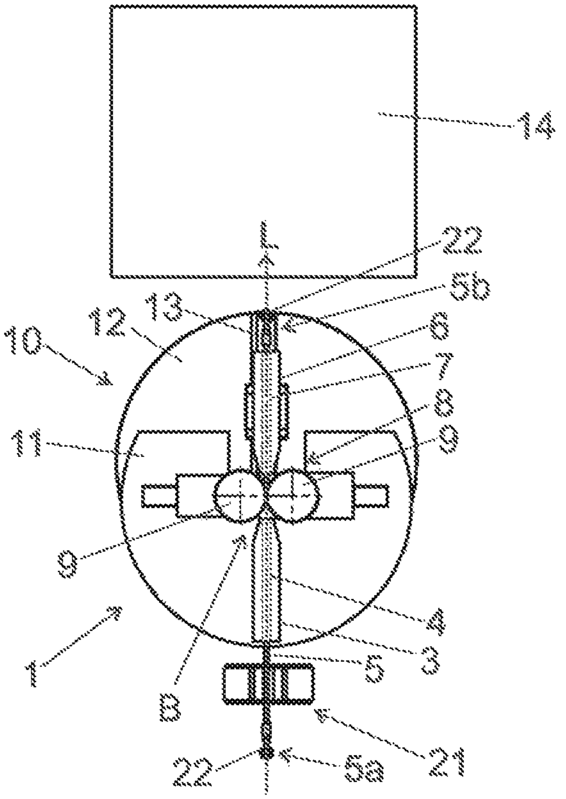

In the position shown in FIGS. 9*a* and 9*b* the support device 10 was rotated through 180° in the clockwise direction about the axis of rotation R so that now the second wire end 5*b* of the wire 5 is oriented in the direction of the opening 15 of the wire manufacturing device 14. It will be appreciated that, depending on the respective arrangement of a processing unit, the support device 10 can be rotated into any desired angular position.

The positions shown in FIGS. 10*a* and 10*b*, 11*a* and 11*b* substantially correspond to the positions of FIGS. 7*a* and 7*b* and FIGS. 8*a* and 8*b*, with the difference that now the second wire end 5*b* has been provided in the wire manufacturing device 14 with a wire termination 22 in the form of a cable shoe. In addition a transfer device 21 in the form of a robot arm with gripping tongs has been moved to the first wire guide device 3.

Figure 12A:
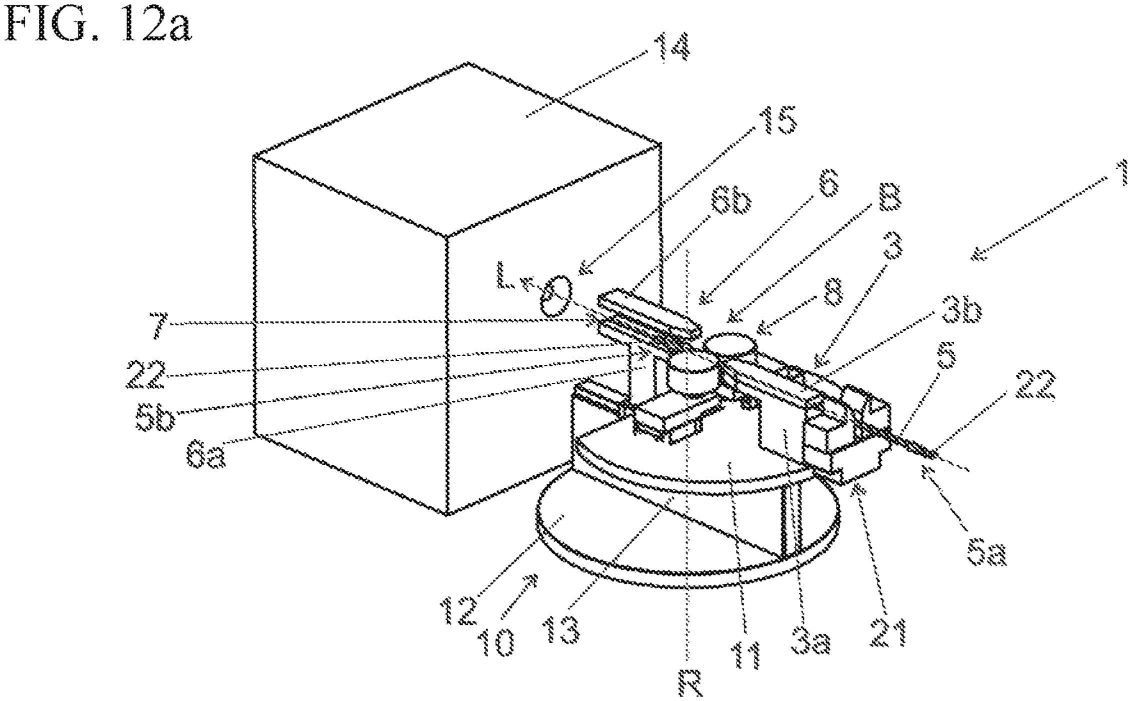
Figure 12B:
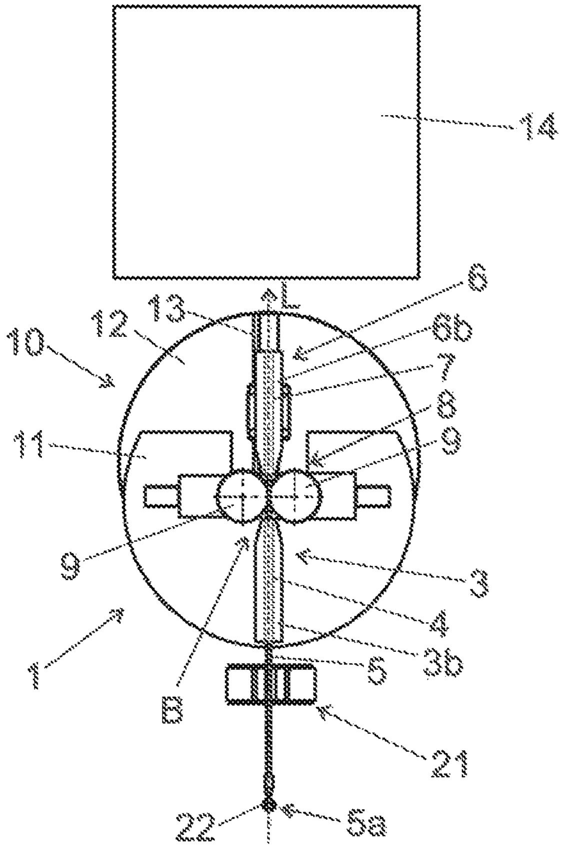

In the position of the wire handling apparatus 1 shown in FIGS. 12*a* and 12*b* the second guide part 6*b* of the second wire guide device 6 has been lifted off the first guide part 6*a* of the second wire guide device 6 in a direction transversely relative to the longitudinal direction L—in the specific example in a direction parallel to the axis of rotation R—. In that way the second guide portion 7 has been enlarged so that now the second wire end 5*b* which is thicker because of the wire termination 22 in relation to the wire diameter can be passed along the second guide portion 7 through the second wire guide device 6. It is also possible to see the recess of a continuous trough-shaped configuration in the longitudinal direction L in the first guide part 6*a* of the second wire guide device 6, which in conjunction with a recess which is also of a continuous trough-shaped configuration in the longitudinal direction L in the second guide part 6*b* of the second wire guide device 6, forms the second guide portion 7. In the illustrated position the wire 5 has already been moved by the wire conveyor apparatus 8 in a direction opposite to the longitudinal direction L, but the second wire end 5*b* is still in the region of the second wire guide device 6.

Figure 13A:
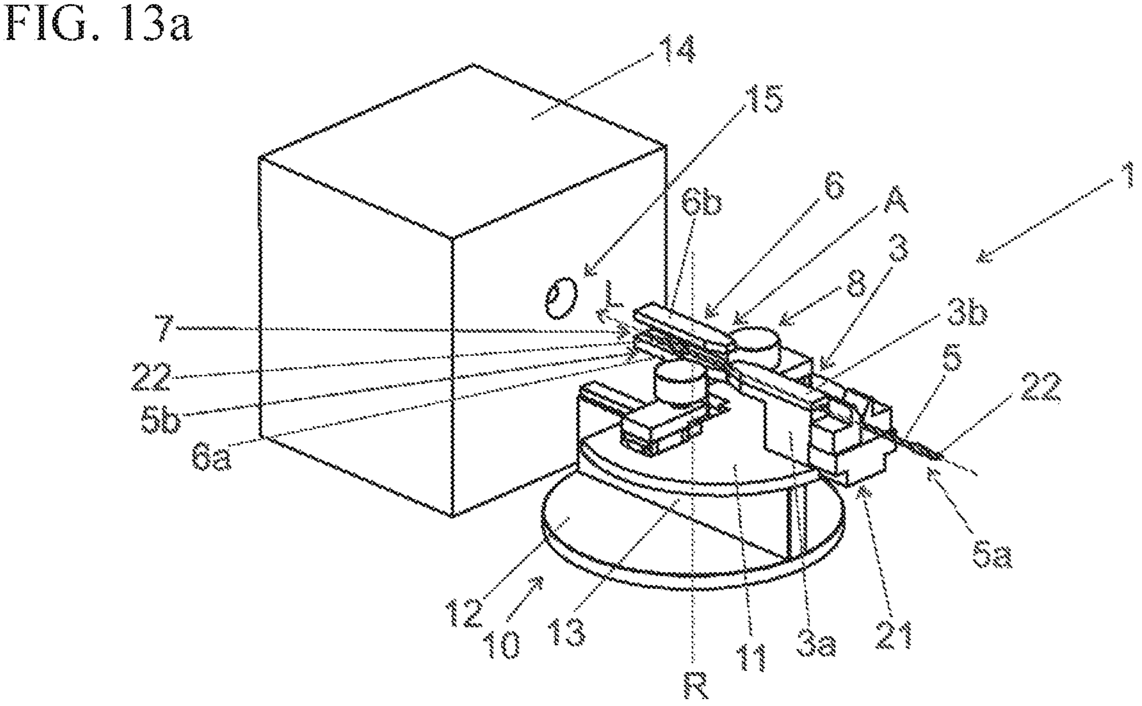
Figure 13B:
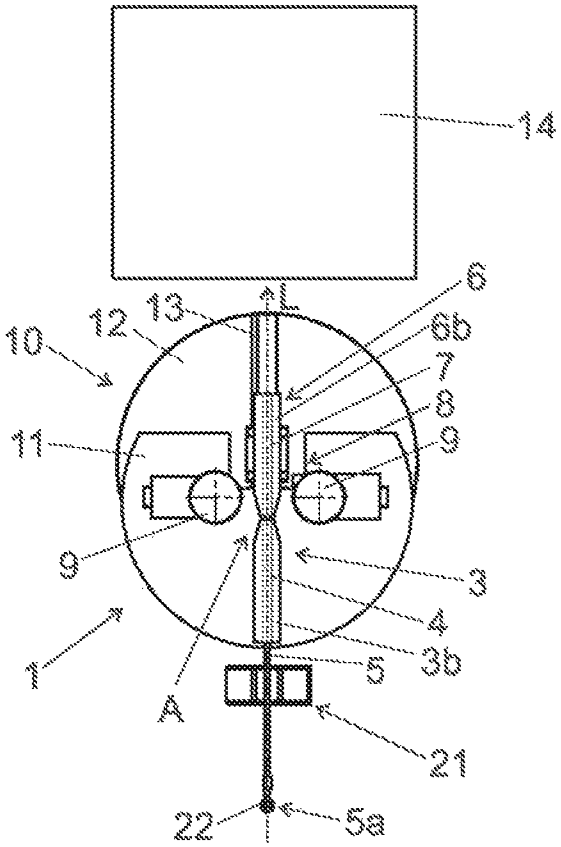

In the position shown in FIGS. 13*a* and 13*b* the second wire guide device 6 has been moved in opposite relationship to the longitudinal direction L relative to the first wire guide device 3 so that the two wire guide devices 3, 6 were transferred from their conveyor position B into their pass-through position A in which the first wire guide device 3 and the second wire guide device 6 are arranged in substantially immediate succession in the longitudinal direction L. At the same time the transport rollers 9 of the wire conveyor apparatus 8 were moved radially outwardly in relation to the longitudinal direction L and thus brought out of engagement with the wire 5.

Figure 14A:
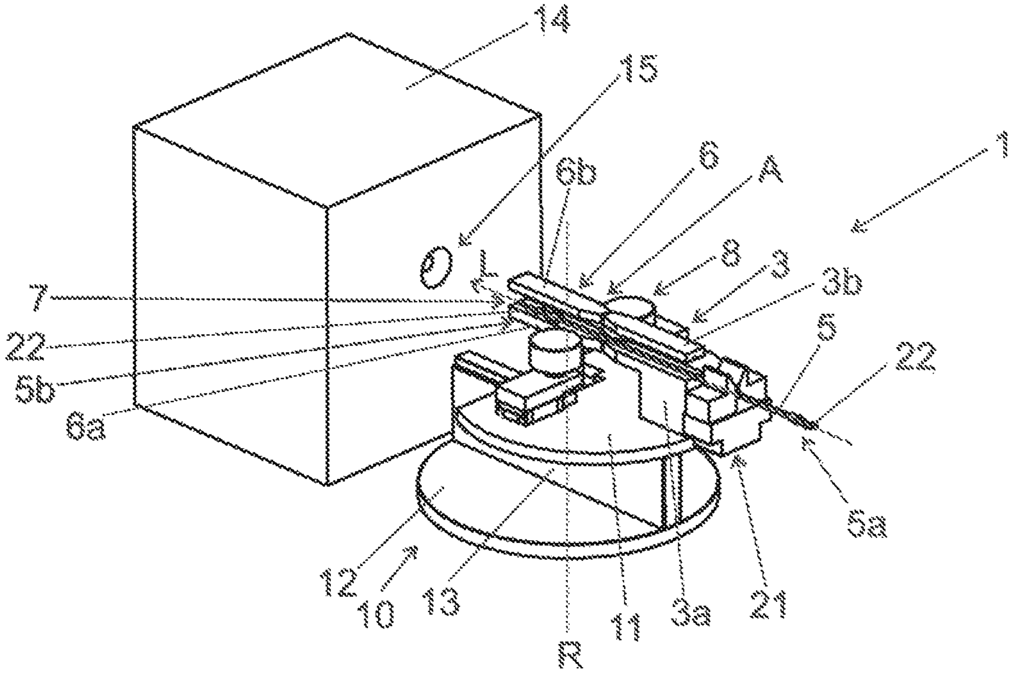
Figure 14B:
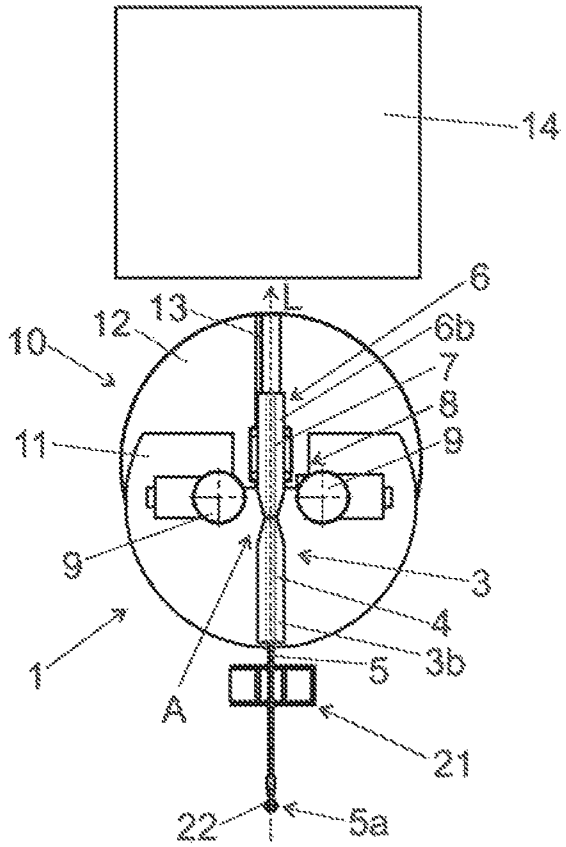

In the position of FIGS. 14*a* and 14*b* the second guide part 3*b* of the first wire guide device 3 has also been lifted off the first guide part 3*a* of the first wire guide device 3 in a direction transversely relative to the longitudinal direction L—in the specific example in a direction parallel to the axis of rotation R—. In that way the first guide portion 4 was also increased in size so that the second wire end 5*b* which is thicker because of the wire termination 22 in relation to the wire diameter can also be passed along the first guide portion 4 through the first wire guide device 3. It is also possible to see the recess of a continuous trough-shaped configuration in the longitudinal direction L in the first guide part 3*a* of the first wire guide device 3, which in conjunction with a recess of a continuous trough-shaped configuration also in the longitudinal direction L in the second guide part 3*b* of the first wire guide device 3, forms the first guide portion 4.

Figure 15A:
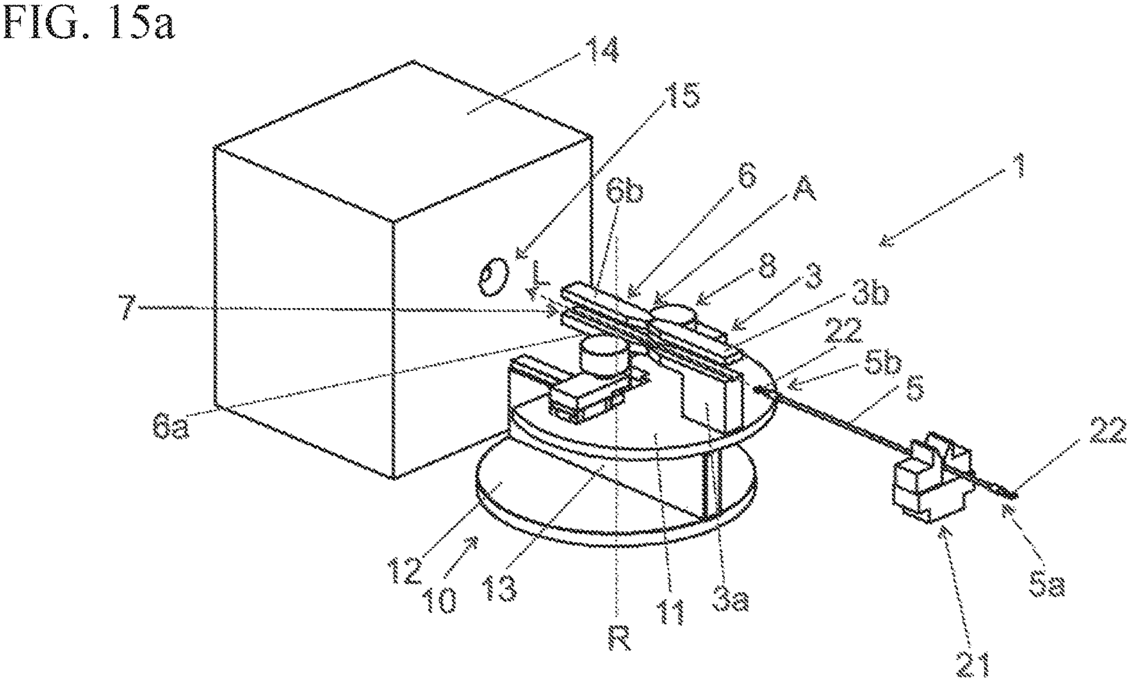
Figure 15B:
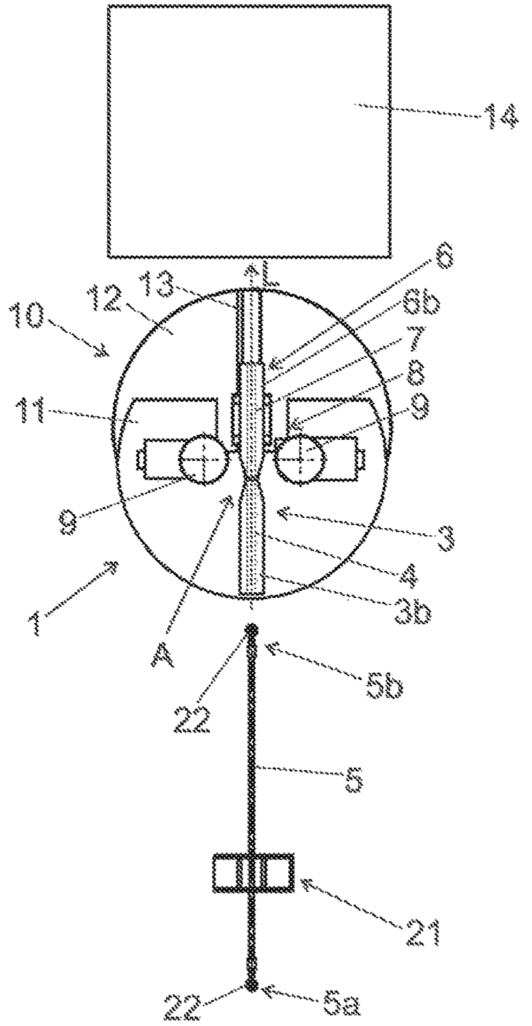

In the position of the wire handling apparatus 1 shown in FIGS. 15*a* and 15*b* the finished wire 5 has been gripped by the gripping tongs of the transfer device 21 and removed from the wire handling apparatus 1 by the transfer device 21. The wire 5 can now be transferred by the transfer device 21 to further processing stations which may be present, like for example a marking station or an arrangement station.

The described operating procedure represents only a possible example of a manufacturing process for a wire 5. It will be appreciated that it is also possible that the wire 5 is transferred from the other side—that is to say beginning with the second wire guide device 6—to the wire handling apparatus 1 or that only one of the two wire ends is processed by a processing unit.

LIST OF REFERENCES

1 wire handling apparatus
2 manufacturing apparatus
3 first wire guide device
3*a* first guide part of the first wire guide device
3*b* second guide part of the first wire guide device
4 first guide portion
5 wire
5*a* first wire end
5*b* second wire end
6 second wire guide device
6*a* first guide part of the second wire guide device
6*b* second guide part of the second wire guide device
7 second guide portion
8 wire conveyor apparatus
9 transport roller
10 support device
11 first support plate
12 second support plate
13 guide bar
14 wire manufacturing device
15 opening
16 connecting device
17 conical region of the connecting device
18 wire reservoir
19 advance device
20 cutting device
21 transfer device
22 wire termination
L longitudinal direction
A pass-through position
B conveyor position
R axis of rotation

The invention claimed is:

1. A wire handling apparatus for a manufacturing apparatus, the wire handling apparatus comprising:
an elongate first wire guide device having a first guide portion to guide a wire along the first guide portion;
an elongate second wire guide device having a second guide portion to guide a wire along the second guide portion; and
a support device, wherein the first wire guide device and the second wire guide device are arranged on the support device,
wherein the support device is mounted rotatably about an axis of rotation, and the first wire guide device is divisible along the first guide portion into at least two parts and/or the second wire guide device is divisible along the second guide portion into at least two parts,
wherein the first wire guide device and the second wire guide device are arranged moveably relative to each other, and
wherein the at least two parts of the first wire guide device and/or the second wire guide device are moveable relative to each other.

2. The wire handling apparatus according to claim 1, wherein the first wire guide device and/or the second wire guide device has a substantially tubular configuration.

3. The wire handling apparatus according to claim 2, wherein the first guide portion and/or the second guide portion is a substantially cylindrical hollow space.

4. The wire handling apparatus according to claim 1, wherein the first guide portion has a substantially rectilinear configuration along a longitudinal direction and/or the second guide portion has a substantially rectilinear configuration along the longitudinal direction.

5. The wire handling apparatus according to claim 4, wherein the first wire guide device and the second wire guide device are arranged in succession in the longitudinal direction.

6. The wire handling apparatus according to claim 4, wherein the first wire guide device and the second wire guide device are arranged in a mutually aligned relationship in the longitudinal direction.

7. The wire handling apparatus according to claim 4, wherein the first wire guide device is moveable in the longitudinal direction relative to the second wire guide device, and/or the second wire guide device is moveable in the longitudinal direction relative to the first wire guide device.

8. The wire handling apparatus according to claim 4, wherein the first wire guide device and the second wire guide device are moveable into a pass-through position, and in the pass-through position, the first wire guide device and the second wire guide device are arranged substantially directly in succession in the longitudinal direction.

9. The wire handling apparatus according to claim 4, wherein the first wire guide device and the second wire guide device are moveable into a conveyor position, and in the conveyor position, the first wire guide device and the second wire guide device are arranged in mutually spaced relationship in the longitudinal direction.

10. The wire handling apparatus according to claim 9, wherein the wire handling apparatus includes a wire conveyor apparatus, the wire conveyor apparatus being moveable in the conveyor position between the first wire guide device and the second wire guide device.

11. The wire handling apparatus according to claim 10, wherein the wire conveyor apparatus includes two mutually oppositely rotating transport rollers.

12. The wire handling apparatus according to claim 1, wherein the first wire guide device and/or the second wire guide device is arranged moveably on the support device with a translation movement in the longitudinal direction.

13. The wire handling apparatus according to claim 1, wherein the support device is mounted moveably in a translation movement.

14. The wire handling apparatus according to claim 1, wherein the support device includes a first support plate and a second support plate, the first support plate being moveable relative to the second support plate.

15. The wire handling apparatus according to claim 14, wherein a guide bar is arranged at the second support plate, the first support plate being arranged displaceably along the guide bar.

16. A manufacturing apparatus comprising the wire handling apparatus according to claim 1.

17. The manufacturing apparatus according to claim 16, wherein the manufacturing apparatus includes a processing unit in the form of a wire manufacturing device.

18. The manufacturing apparatus according to claim 17, wherein the wire manufacturing device has an opening for receiving a wire end, the opening having a funnel-shaped configuration.

19. The manufacturing apparatus according to claim 18, wherein the wire handling apparatus further includes a connecting device for docking the wire handling apparatus to the wire manufacturing device, wherein the connecting device has a conical region corresponding to the funnel-shaped opening.

20. The manufacturing apparatus according to claim 19, wherein the connecting device is a first connecting device, the wire handling apparatus further including a second connecting device, a respective one of the first connecting device and the second connecting device being arranged at the mutually remote ends of the first wire guide device and the second wire guide device.

21. A wire handling apparatus for a manufacturing apparatus, the wire handling apparatus comprising:

an elongate first wire guide device having a first guide portion to guide a wire along the first guide portion;

an elongate second wire guide device having a second guide portion to guide a wire along the second guide portion; and a support device, the first wire guide device and the second wire guide device being arranged on the support device, wherein the support device is mounted rotatably about an axis of rotation, and the first wire guide device is divisible along the first guide portion into at least two parts and/or the second wire guide device is divisible along the second guide portion into at least two parts, wherein the first wire guide device and the second wire guide device are arranged moveably relative to each other, and wherein the at least two parts of the first wire guide device and/or the second wire guide device include a first guide part and a second guide part, and the second guide part is liftable off the first guide part.

* * * * *